US012691783B2

(12) United States Patent
Sano

(10) Patent No.: US 12,691,783 B2
(45) Date of Patent: Jul. 28, 2026

(54) MANAGEMENT DEVICE

(71) Applicant: TOYOTA JIDOSHA KABUSHIKI KAISHA, Toyota (JP)

(72) Inventor: Takaaki Sano, Izumi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 654 days.

(21) Appl. No.: 18/334,750

(22) Filed: Jun. 14, 2023

(65) Prior Publication Data

US 2024/0067040 A1     Feb. 29, 2024

(30) Foreign Application Priority Data

Aug. 25, 2022     (JP) ................................. 2022-134321

(51) Int. Cl.
B60L 55/00          (2019.01)
B60L 58/14          (2019.01)
(52) U.S. Cl.
CPC ............... B60L 55/00 (2019.02); B60L 58/14 (2019.02)
(58) Field of Classification Search
CPC .......... B60L 55/00; B60L 58/14; B60L 53/67; B60L 53/68; B60L 53/63
USPC ....................................................... 320/109
See application file for complete search history.

(56) References Cited

U.S. PATENT DOCUMENTS

| 12,192,312 B2* | 1/2025 | Choi ................. H04L 12/40013 |
| 12,586,127 B2* | 3/2026 | Sun ........................ G06Q 40/04 |
| 2018/0218459 A1 | 8/2018 | Yokoyama et al. |

FOREIGN PATENT DOCUMENTS

JP          2018-124674 A      8/2018

* cited by examiner

*Primary Examiner* — Nathaniel R Pelton
(74) *Attorney, Agent, or Firm* — Finnegan, Henderson, Farabow, Garrett and Dunner, LLP

(57)          ABSTRACT

A server executes: a classification process of classifying each of a plurality of power resources into a first resource and a second resource with a capacity of the power storage device larger than the capacity of the power storage device of the first resource; and a resource selection process of selecting, from among the power resources, an adjustment resource of which participation in the power adjustment is requested. The resource selection process includes a first selection process of preferentially selecting the second resource as the adjustment resource over the first resource when a power adjustment request is a first request, and a second selection process of preferentially selecting the first resource as the adjustment resource over the second resource when the power adjustment request is a second request. A power adjustment amount of the first request is larger than a power adjustment amount of the second request.

7 Claims, 8 Drawing Sheets

650　620

| RESOURCE ID | TYPE | CAPACITY OF POWER STORAGE DEVICE | REFERENCE DISCHARGE POWER | .... |
|---|---|---|---|---|
| R-1 | BEV | BC1 | RDP1 | .... |
| R-2 | BEV | BC2 | RDP2 | .... |
| R-3 | PHEV | BC3 | RDP3 | .... |
| R-4 | PHEV | BC4 | RDP4 | .... |
| ⋮ | ⋮ | ⋮ | ⋮ | .... |

MANAGEMENT DEVICE

CROSS-REFERENCE TO RELATED APPLICATION

This application claims priority to Japanese Patent Application No. 2022-134321 filed on Aug. 25, 2022, incorporated herein by reference in its entirety.

BACKGROUND

1. Technical Field

The present disclosure relates to a management device, and more particularly to a management device that manages multiple power resources.

2. Description of Related Art

Japanese Unexamined Patent Application Publication No. 2018-124674 (JP 2018-124674 A) discloses a vehicle-to-grid (V2G) system. The system includes a power grid and an electrified vehicle as a power supply source. An electrified vehicle is equipped with a power storage device, and is configured to be able to discharge power from the power storage device to the power grid in order to maintain a supply and demand balance in the power grid.

SUMMARY

There is known a management device that manages a plurality of power resources, each of which is equipped with a power storage device. Each power resource may be configured to be able to participate in power adjustment for adjusting the power supply and demand balance in the power grid by discharging the power of the power storage device to the power grid. Generally, the management device includes a communication device that communicates with each power resource. When the power adjustment is requested, the management device selects, from among the plurality of power resources, an adjustment resource for which participation in the power adjustment is requested through the communication device. The plurality of power resources may include a power resource equipped with a large-capacity power storage device (large capacity resource) and a power resource equipped with a small-capacity power storage device (small capacity resource).

The power adjustment amount in the power grid may increase from the originally scheduled power adjustment amount. When the original power adjustment amount is small, the increase in the power adjustment amount tends to be small. Therefore, the small capacity resource can follow the increase in the power adjustment amount even when selected as the adjustment resource. On the other hand, when the original power adjustment amount is large, the increase in the power adjustment amount tends to be large. Therefore, the small capacity resource may not be able to follow the increase in the power adjustment amount.

On the other hand, when a large capacity resource is selected as an adjustment resource, it easily follows the increase in the power adjustment amount not only when the increase in the power adjustment amount is small but also when the increase is large. Therefore, it seems preferable for the management device to select only the large capacity resource from among the small capacity resource and the large capacity resource as the adjustment resource. However, when the adjustment resource is selected in such a manner, the power adjustment may not be able to be properly performed due to the insufficient number of large capacity resources.

The present disclosure has been made to solve the above problem, and its object is to appropriately utilize small capacity resources as adjustment resources while enabling the small capacity resources to follow an increase in the power adjustment amount in a management device that manages a plurality of power resources, each of which can participate in the power adjustment by discharging.

A management device of the present disclosure manages a plurality of power resources. Each of the power resources is equipped with a power storage device and is configured to be able to participate in power adjustment in a power grid by discharging power of the power storage device to the power grid. The management device includes a communication unit and a processing unit. The communication unit is configured to communicate with each of the power resources. The processing unit executes: a classification process of classifying each of a plurality of power resources into a first resource and a second resource with a capacity of the power storage device larger than the capacity of the power storage device of the first resource; and a resource selection process of selecting, from among the power resources, an adjustment resource of which participation in the power adjustment is requested through the communication unit, in response to an adjustment request requesting implementation of the power adjustment. The resource selection process includes a first selection process of preferentially selecting the second resource as the adjustment resource over the first resource when the adjustment request is a first request, and a second selection process of preferentially selecting the first resource as the adjustment resource over the second resource when the adjustment request is a second request. A power adjustment amount of the first request is larger than a power adjustment amount of the second request. The first request is the adjustment request different from the second request. The second request is the adjustment request for eliminating imbalance that is the difference between a power demand amount and a power supply amount in the power grid.

According to the above configuration, when the adjustment request is the first request, that is, when the power adjustment amount is large, the second resource (large capacity resource) is preferentially selected as the adjustment resource over the first resource (small capacity resource). This makes it easier to follow the increase in the power adjustment amount than when the first resource is selected as the adjustment resource. Furthermore, even when the power adjustment amount of the first request is large, the power adjustment amount can be easily achieved. On the other hand, when the adjustment request is the second request, that is, when the power adjustment amount is small, the first resource is preferentially selected as the adjustment resource over the second resource. As described above, the first resource (small capacity resource) can follow an increase in the power adjustment amount when the power adjustment amount is small. When the first resource is preferentially selected as the adjustment resource as described above, the first resource can be appropriately utilized as the adjustment resource while enabling the first resource to follow the increase in the power adjustment amount.

According to the present disclosure, in managing a plurality of power resources, each of which can participate in the power adjustment by discharging, small capacity resources can be appropriately utilized as adjustment resources while enabling the small capacity resources to follow an increase in the power adjustment amount.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a flowchart showing detailed procedures of a resource selection process (S20 in FIG. 6);

FIG. 9 is a flowchart showing processes performed by the server to eliminate the imbalance;

FIG. 10 is a diagram showing a schematic configuration of a power management system according to a second embodiment; and FIG. 11 is a diagram illustrating a detailed configuration of power storage equipment.

DETAILED DESCRIPTION OF EMBODIMENTS

Figure 1:
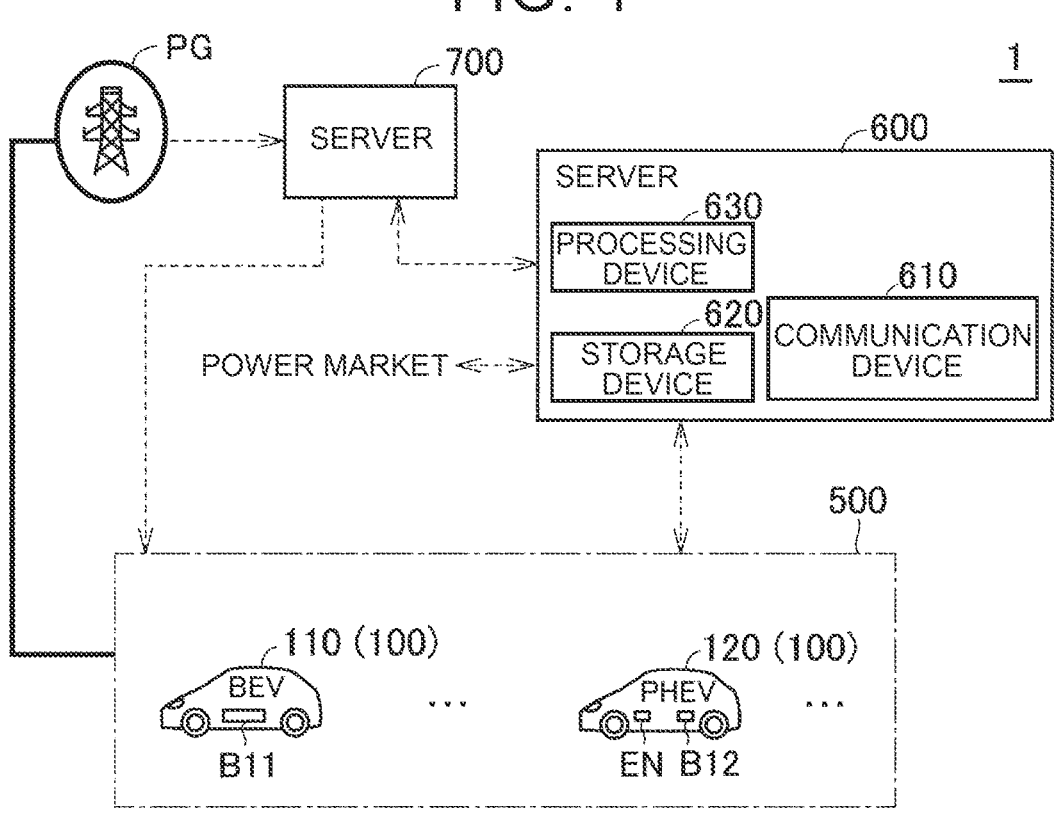
FIG. 1 is a diagram showing a schematic configuration of a power management system according to a first embodiment.

An embodiment of the present disclosure will be described in detail with reference to the drawings. In the drawings, the same or corresponding parts are denoted by the same reference signs and the description thereof will not be repeated.

First Embodiment

FIG. 1 is a diagram showing a schematic configuration of a power management system according to a first embodiment. With reference to FIG. 1, a power management system 1 includes a power grid PG, a resource group 500, a server 600, and a server 700.

The power grid PG is constructed by power transmission and distribution facilities and is maintained and managed by a power company.

The resource group 500 (a plurality of power resources) includes at least one battery electric vehicle (BEV) 110 and at least one plug-in hybrid electric vehicle (PHEV) 120.

The BEV 110 is equipped with a power storage device B11 and travels using the power of the power storage device B11. The PHEV 120 is equipped with a power storage device B12 and an engine EN, and travels using the power of the power storage device B12 or the driving force of the engine EN.

It is assumed that the capacity of the power storage device B11 is larger than the capacity of the power storage device B12. Therefore, the BEV 110 is an example of a large capacity resource, and the PHEV 120 is an example of a small capacity resource. Hereinafter, each of the BEV 110 and the PHEV 120 will be referred to as "vehicle 100," and each of the power storage devices B11 and B12 will also be referred to as "power storage device B1," unless they are particularly distinguished from each other.

In this way, each power resource of the resource group 500 (hereinafter also simply referred to as "resource") is equipped with a power storage device. Each resource is configured to be able to participate in power adjustment in the power grid PG by discharging the power of its power storage device (the power storage device B11 or B12) to the power grid PG. A period during which the power adjustment is performed is also referred to as a "power adjustment period".

In this example, the resource group 500 includes multiple BEVs 110 and multiple PHEVs 120. For ease of explanation, it is assumed that the power storage device B11 of each BEV 110 has the same capacity, and the power storage device B12 of each PHEV 120 has the same capacity.

The server 600 includes a communication device 610, a storage device 620, and a processing device 630. The communication device 610 communicates with each resource of the resource group 500 and an external device of the server 600 such as the server 700 (described later). The storage device 620 includes, for example, a random access memory (RAM), a read-only memory (ROM), and the like (neither shown). The ROM stores programs executed by the processing device 630 and various data. The data includes resource management information (described later) for managing each resource. The processing device 630 includes a central processing unit (CPU). The server 600 may further include an input device (not shown) that receives an input of the power supply and demand plan value in the power grid PG.

The server 600 belongs to an aggregator and is a management device that manages the resource group 500. An aggregator is a business operator that manages the resource group 500 and provides an energy management service.

The server 600 executes a resource selection process of selecting at least one adjustment resource from among the resources of the resource group 500 in response to a power adjustment request requesting implementation of the power adjustment. The power adjustment request may include information indicating the total amount of discharge power (power adjustment amount) that is required to be discharged from each adjustment resource to the power grid during the power adjustment period. The server 600 calculates the discharge power to be allocated to each adjustment resource (allocated discharge power) when executing the resource selection process. The resource selection process is a process for selecting at least one adjustment resource such that the total allocated discharge power of the at least one adjustment resource achieves the power adjustment amount.

The server 600 trades adjustment capability in the power market to implement the power adjustment. The adjustment capability is the capability to perform the power adjustment (frequency control, supply and demand balance adjustment, etc.) in the power grid PG. In the power market, the adjustment capability is traded on a frame-by-frame basis (specifically, the right to participate in the power adjustment on a frame-by-frame basis is traded as a product). A frame is a frame in which one day is divided by unit time. The frame length (unit time) is, for example, 30 minutes. The server 600 generates a power adjustment request when the server 600 successfully bids for the adjustment capability in the power market. The server 600 may be configured to receive a power adjustment request from the server 700. The server 700 belongs to a power company and is configured to be communicable with the server 600.

Figure 2:
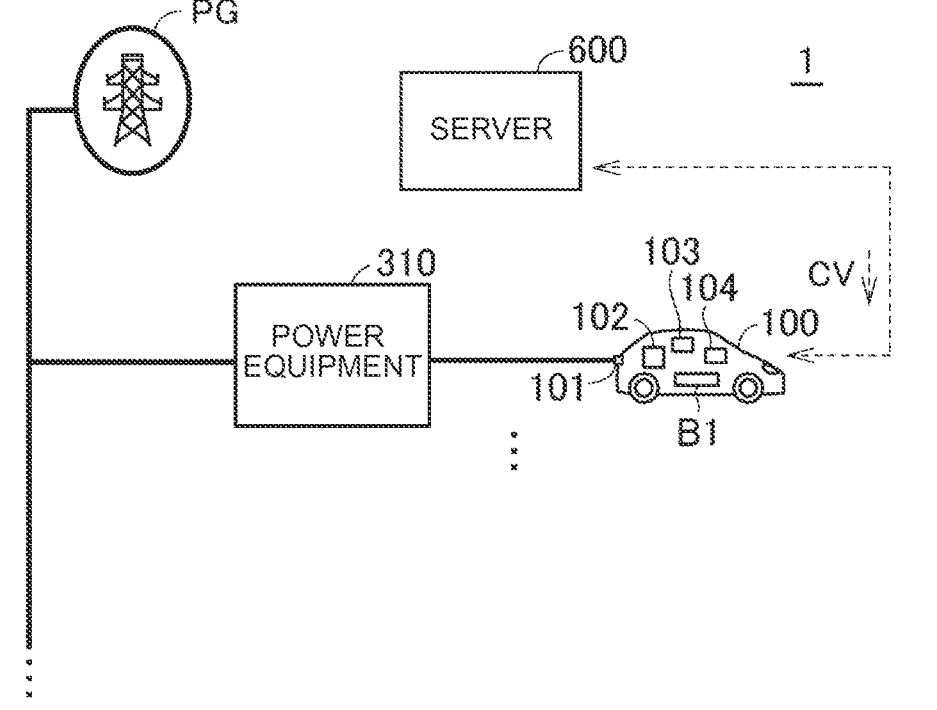
FIG. 2 is a diagram illustrating a detailed configuration of a vehicle.

FIG. 2 is a diagram illustrating a detailed configuration of the vehicle 100. With reference to FIG. 2, the vehicle 100 is electrically connected to the power grid PG via power equipment 310. The vehicle 100 includes an inlet 101, a charger/discharger 102, a communication device 103, and an electronic control unit (ECU) 104.

The inlet 101 is configured to be able to receive the power supplied from the power equipment 310 through a power cable. The charger/discharger 102 charges the power storage device B1 using the power received through the inlet 101, and discharges the power of the power storage device B1 to the power grid PG. The communication device 103 communicates with devices outside the vehicle 100, such as the server 600 and the power equipment 310. The ECU 104 controls the charger/discharger 102 and the communication device 103.

The ECU 104 controls the discharge power from the vehicle 100 to the power equipment 310 by controlling the charger/discharger 102, for example. The ECU 104 incorporates a memory (not shown). This memory includes information indicating the capacity of the power storage device B1 and the reference discharge power of the power storage device B1. The reference discharge power is a reference for the discharge power of the power storage device B1, and is basically used as the allocated discharge power. The reference discharge power is less than the upper limit discharge power of the power storage device B1. The upper limit discharge power is determined in advance based on the specifications of the power storage device B1. The reference discharge power is related to the capacity of the power storage device B1, and is set to increase as the capacity increases.

The communication device 103 may be configured to receive from the server 600 a command value CV for the discharge power from the vehicle 100 to the power grid PG. In this case, the discharge power may be remotely controlled by the server 600 in accordance with the command value CV.

Figures 3, 4:
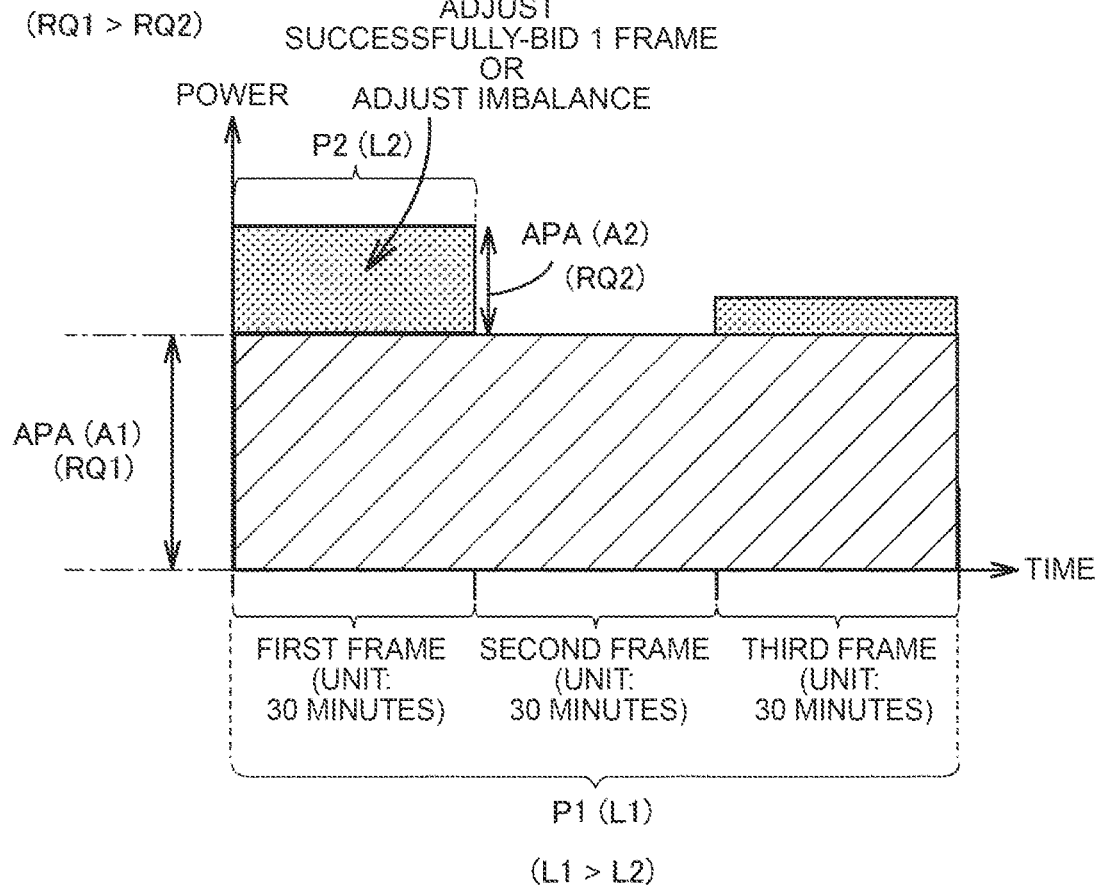
FIG. 3 is a diagram illustrating resource management information stored in a storage device.
FIG. 4 is a diagram illustrating how power adjustment is implemented.

FIG. 3 is a diagram illustrating the resource management information stored in the storage device 620. With reference to FIG. 3, resource management information 650 indicates the identification (ID), the type (BEV/PHEV), the capacity of the power storage device B1, and the reference discharge power of the power storage device B1 for each resource.

FIG. 4 is a diagram illustrating how the power adjustment is implemented. With reference to FIG. 4, requests RQ1 and RQ2 are separate power adjustment requests although they are shown in the same diagram in this example.

The request RQ1 is a power adjustment request requesting that the power adjustment amount APA in the power grid PG be A1 during the period P1 consisting of the first to third frames. The power adjustment amount APA is the total discharge power allocated to each adjustment resource (allocated discharge power). In this example, as the power adjustment amount APA increases, the allocated discharge power for each adjustment resource also increases. It is assumed that the power adjustment amount APA (A1) of the request RQ1 is larger than a predetermined threshold adjustment amount. A1 is assumed to be larger than the power adjustment amount APA (A2) of the request RQ2 (A1>A2). The request RQ1 is a power adjustment request different from the request RQ2, and in this example, is a power adjustment request for eliminating the renewable energy prediction error in the power grid PG.

The request RQ2 is a power adjustment request requesting that the power adjustment amount APA be A2 during the period P2 consisting of the first frame. It is assumed that the power adjustment amount APA (A2) of the request RQ2 is less than the above threshold adjustment amount. The length L2 of the period P2 is shorter than the length L1 of the period P1 (the length L1 of the period P1 is longer than the length L2 of the period P2). In this example, the request RQ2 is a power adjustment request for eliminating imbalance, which is the difference between the power demand amount and the power supply amount in the power grid PG. This imbalance is, for example, imbalance in balancing.

The power adjustment amount APA may increase from the originally planned power adjustment amount APA. As a result, the allocated discharge power of each adjustment resource may increase from the originally planned allocated discharge power.

When the original power adjustment amount APA is small, the increase in the power adjustment amount APA tends to be small, so the increase in the allocated discharge power also tends to be small. Therefore, even when the PHEV 120, which is a small capacity resource, is selected as an adjustment resource, the PHEV 120 can follow the increase in the power adjustment amount APA (increase in the allocated discharge power) by increasing the discharge power of the charger/discharger 102 from the reference discharge power to a power less than the upper limit discharge power. On the other hand, when the original power adjustment amount APA is large, the increase in the power adjustment amount APA tends to be large, so the increase in the allocated discharge power also tends to be large. Therefore, even if the discharge power of the charger/discharger 102 is increased from the reference discharge power to the upper limit discharge power, the PHEV 120 may not be able to follow the increase in the power adjustment amount APA (increase in the allocated discharge power). That is, even if the discharge power of the charger/discharger 102 is increased to the upper limit discharge power, there is a possibility that the increased allocated discharge power cannot be achieved.

On the other hand, when the BEV 110, which is a large capacity resource, is selected as an adjustment resource, the BEV 110 easily follows the increase in the power adjustment amount APA not only when the increase in the power adjustment amount APA is small but also when the increase is large. Specifically, since the BEV 110 has a wider range from the reference discharge power to the upper limit discharge power than the PHEV 120 does, the BEV 110 easily follows the increase in the power adjustment amount APA by increasing the discharge power of the charger/discharger 102 from the reference discharge power to a power less than the upper limit discharge power. That is, by increasing the discharge power of the charger/discharger 102, the increased allocated discharge power can be easily achieved. Therefore, it seems preferable for the management device to select only the BEV 110 from among the PHEV 120 and the BEV 110 as the adjustment resource. However, when the adjustment resource is selected in such a manner, the power adjustment may not be able to be properly performed due to the insufficient number of BEVs 110.

The server 600 according to the embodiment has a configuration for dealing with the above issue. Specifically, the processing device 630 of the server 600 first executes a resource classification process of classifying each resource of the resource group 500 into the PHEV 120 and the BEV 110. This process corresponds to classifying the resources of the resource group 500 into resources (small capacity resources) in which the capacity of the power storage device B1 is equal to or less than the threshold capacity and resources (large capacity resources) in which the capacity of the power storage device B1 is larger than the threshold capacity. After the resource classification process, the processing device 630 executes a first selection process of preferentially selecting the BEV 110 over the PHEV 120 as an adjustment resource when the power adjustment request is the request RQ1 (that is, when the power adjustment amount APA is large). On the other hand, the processing device 630 executes a second selection process of preferentially selecting the PHEV 120 over the BEV 110 as an adjustment resource when the power adjustment request is the request RQ2 (that is, when the power adjustment amount APA is small). The first and second selection processes are executed as the resource selection process described above.

With such a configuration, when the power adjustment request is the request RQ1 (when the power adjustment amount APA is large), the BEV 110 is preferentially selected as the adjustment resource over the PHEV 120. This makes it easier to follow the increase in the power adjustment amount APA than when the PHEV 120 is selected as the adjustment resource. On the other hand, when the power adjustment request is the request RQ2 (when the power adjustment amount APA is small), the PHEV 120 is preferentially selected as the adjustment resource over the BEV 110. As a result, the PHEV 120 can be appropriately utilized as an adjustment resource while enabling the PHEV 120 to follow the increase in the power adjustment amount APA.

As described above, the reference discharge power is related to the capacity of the power storage device B1, and specifically, the larger the capacity, the larger the reference discharge power. Therefore, the small capacity resource (the PHEV 120) and the large capacity resource (the BEV 110) can be respectively referred to as a small discharge power resource whose reference discharge power is equal to or smaller than the threshold discharge power, and a large discharge power resource whose reference discharge power is larger than the threshold discharge power. The resource classification process described above corresponds to classifying each resource of the resource group 500 into a small discharge power resource and a large discharge power resource. The threshold discharge power is, for example, 2 kW or more and 5 kW or less, and is 3 kW as an example.

When the first selection process is executed, the large discharge power resource (the BEV 110) is preferentially selected as the adjustment resource. This makes it possible to achieve the power adjustment amount APA while reducing the number of adjustment resources. As a result, it becomes easier to secure the necessary number of adjustment resources. Furthermore, management or control of adjustment resources during the power adjustment period can be facilitated. In addition, when the power adjustment period is long (when the power adjustment request is the request RQ1), the BEV 110 is preferentially selected as an adjustment resource over the PHEV 120. This makes it easier to implement the power adjustment that requires a large amount of power to be stably discharged to the power grid PG over a long period of time.

When the second selection process is executed, the small discharge power resource (the PHEV 120) is preferentially selected as the target resource. Accordingly, the number of adjustment resources for achieving the power adjustment amount APA can be increased (the contribution of each adjustment resource to the power adjustment can be reduced). As a result, even if a small number of adjustment resources cancel their participation in the power adjustment, it is possible to reduce the impact of the cancellation on the balance of power supply and demand (the impact on imbalance adjustment). Furthermore, when the power adjustment period is short (when the power adjustment request is the request RQ2), the PHEV 120 is preferentially selected as an adjustment resource over the BEV 110. This makes it easier to implement the power adjustment that requires discharging a small amount of power to the power grid PG in a short period of time in order to finely adjust the amount of power supplied to the power grid PG (to eliminate a small amount of imbalance).

The processing device 630 generates the request RQ1 when an adjustment capability having a number of frames larger than a predetermined number of frames (1 in this example) is successfully bid in the power market. On the other hand, the processing device 630 generates the request RQ2 when an adjustment capability having a number of frames equal to or less than the predetermined number of frames is successfully bid in the power market.

With such a configuration, the request RQ1 or the request RQ2 is generated according to whether the number of frames of the adjustment capability that has been successfully bid in the power market is larger than the predetermined number of frames. Thereby, an appropriate adjustment resource can be selected according to the number of frames of the adjustment capability.

As described above, the request RQ2 is a power adjustment request for eliminating imbalance. In the first embodiment, the PHEV 120 (small discharge power resource) is preferentially selected over the BEV 110 (large discharge power resource) as the adjustment resource for eliminating the imbalance. Therefore, even when finely adjusting the power supply amount in the power grid PG to eliminate the imbalance, the imbalance can be easily eliminated.

Figure 5:
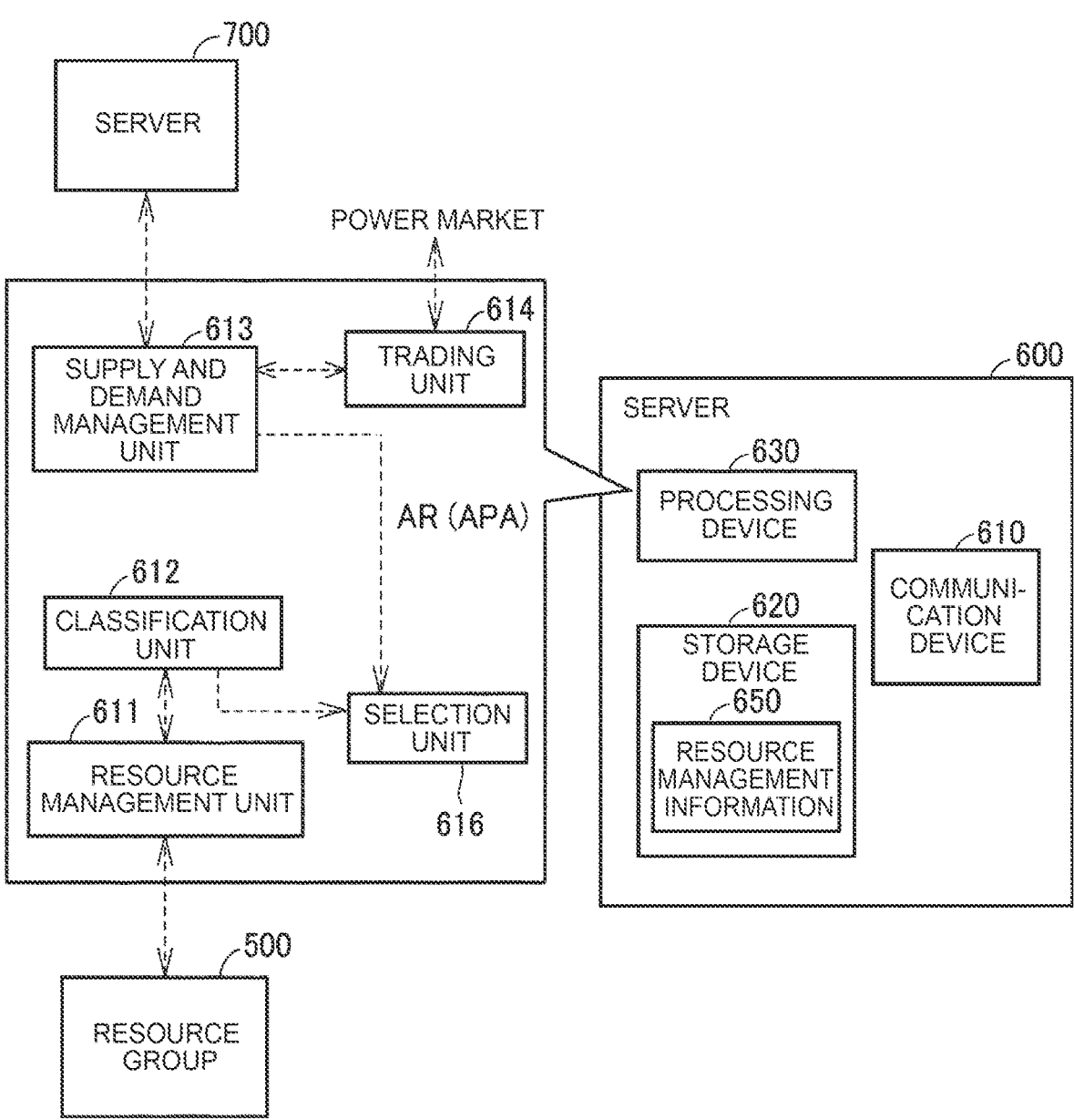
FIG. 5 is a block diagram illustrating functions of a server.

FIG. 5 is a block diagram illustrating functions of the server 600. With reference to FIG. 5, the server 600 includes a resource management unit 611, a classification unit 612, a supply and demand management unit 613, a trading unit 614, and a selection unit 616 as its functional configuration. These functions are performed when the processing device 630 executes programs in the storage device 620.

The resource management unit 611 is configured to acquire resource information from each resource of the resource group 500. The resource information includes information indicating an ID assigned to the corresponding resource, the resource type (BEV/PHEV), the capacity of the power storage device of the resource, and the reference discharge power of the power storage device. The resource management unit 611 generates the resource management information 650 (FIG. 3) in the storage device 620 in accordance with the acquired resource information, and manages the resource group 500 based on the resource management information 650.

The classification unit 612 executes the resource classification process of classifying each resource of the resource group 500. Thus, each resource is classified into the PHEV 120 (small capacity resource, small discharge power resource) and the BEV 110 (large capacity resource, large discharge power resource). The resource classification process is executed in response to a power adjustment request AR in this example.

The supply and demand management unit 613 is configured to acquire supply and demand information of the power grid PG from the server 700. Furthermore, the supply and demand management unit 613 monitors the actual supply and demand of the power grid PG. The actual supply and demand of the power grid PG is measured by a watt-hour meter provided in the power grid PG. The supply and demand management unit 613 generates a power adjustment request AR when an imbalance is caused (or when the imbalance is predicted) in the power grid PG. The power adjustment request AR includes information indicating the power adjustment amount APA. The power adjustment amount APA is set according to the actual supply and demand of the power grid PG.

The trading unit 614 trades the adjustment capability in the power market for implementing the power adjustment. The trading unit 614 requests the supply and demand management unit 613 to generate a power adjustment request AR when the adjustment capability is successfully bid in the power market.

The selection unit 616 executes the resource selection process of selecting the adjustment resource from the resource group 500, in response to the power adjustment request AR. A signal (not shown) is then transmitted by the communication device 610 requesting the adjustment resource to participate in the power adjustment.

Figure 6:
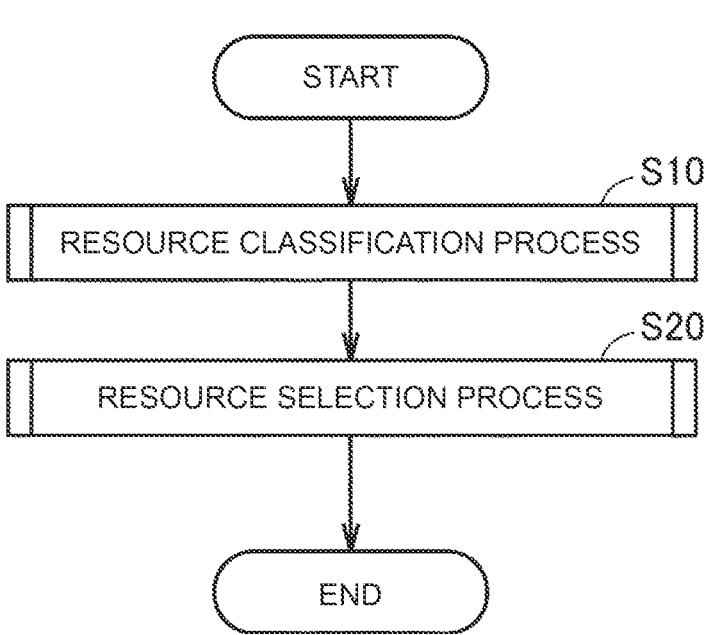
FIG. 6 is a flowchart illustrating processes executed by a server according to the first embodiment.

FIG. 6 is a flowchart illustrating a process executed by the server 600 according to the first embodiment. This flowchart starts when the server 600 successfully bids for the adjustment capability in the power market. Hereinafter, the step is abbreviated as S. With reference to FIG. 6, the server 600 executes the resource classification process (S10), and then executes the resource selection process (S20).

Figure 7:
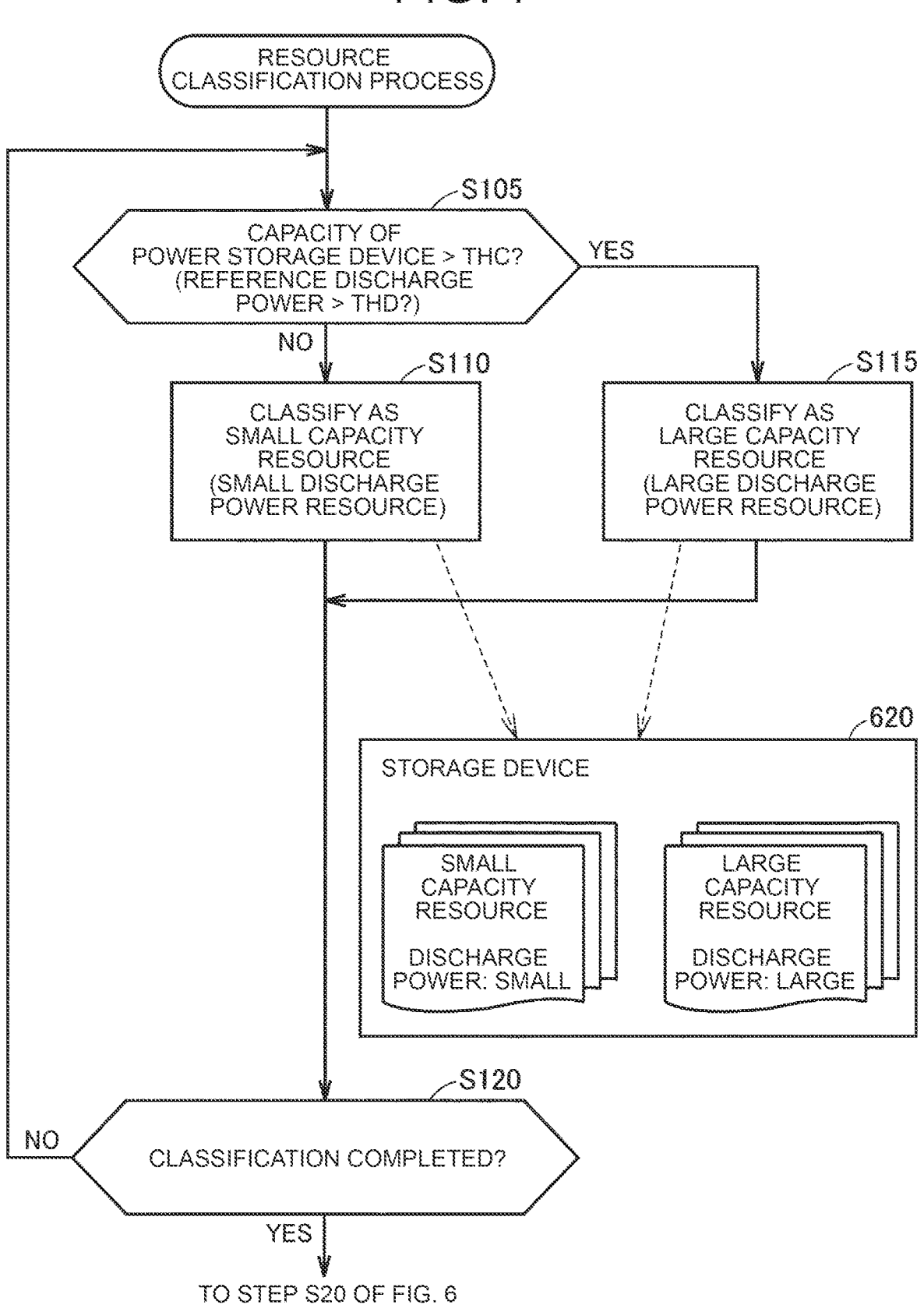
FIG. 7 is a flowchart showing detailed procedures of a resource classification process (S10 in FIG. 6)

FIG. 7 is a flowchart showing detailed procedures of the resource classification process (S10 in FIG. 6). With reference to FIG. 7, the server 600 determines whether the capacity of the power storage device B1 of the resource serving as the classification target is larger than a threshold capacity THC in accordance with the resource management information 650 (FIG. 3) (S105). This determination process also corresponds to determining whether the reference discharge power of the resource serving as the classification target is larger than the threshold discharge power THD.

When the capacity of the power storage device B1 serving as the classification target is equal to or less than the threshold capacity THC (NO in S105), the server 600 classifies the resource serving as the classification target as a small capacity resource (small discharge power resource) (S110). On the other hand, when the capacity of the power storage device B1 serving as the classification target is larger than the threshold capacity THC (YES in S105), the server 600 classifies the resource serving as the classification target as a large capacity resource (large discharge power resource) (S115). Information indicating the result of classification is stored in the storage device 620.

The server 600 determines whether all resources have been classified according to the resource management information 650 (S120). Resource classification is executed for each resource ID. When the classification has not been completed, that is, when there is an unclassified resource (NO in S120), the process returns to S105. After that, the processes of S105 to S115 are executed for the unclassified resource. On the other hand, when all resources have been classified (YES in S120), the process proceeds to S20 (FIG. 6).

Figure 8:
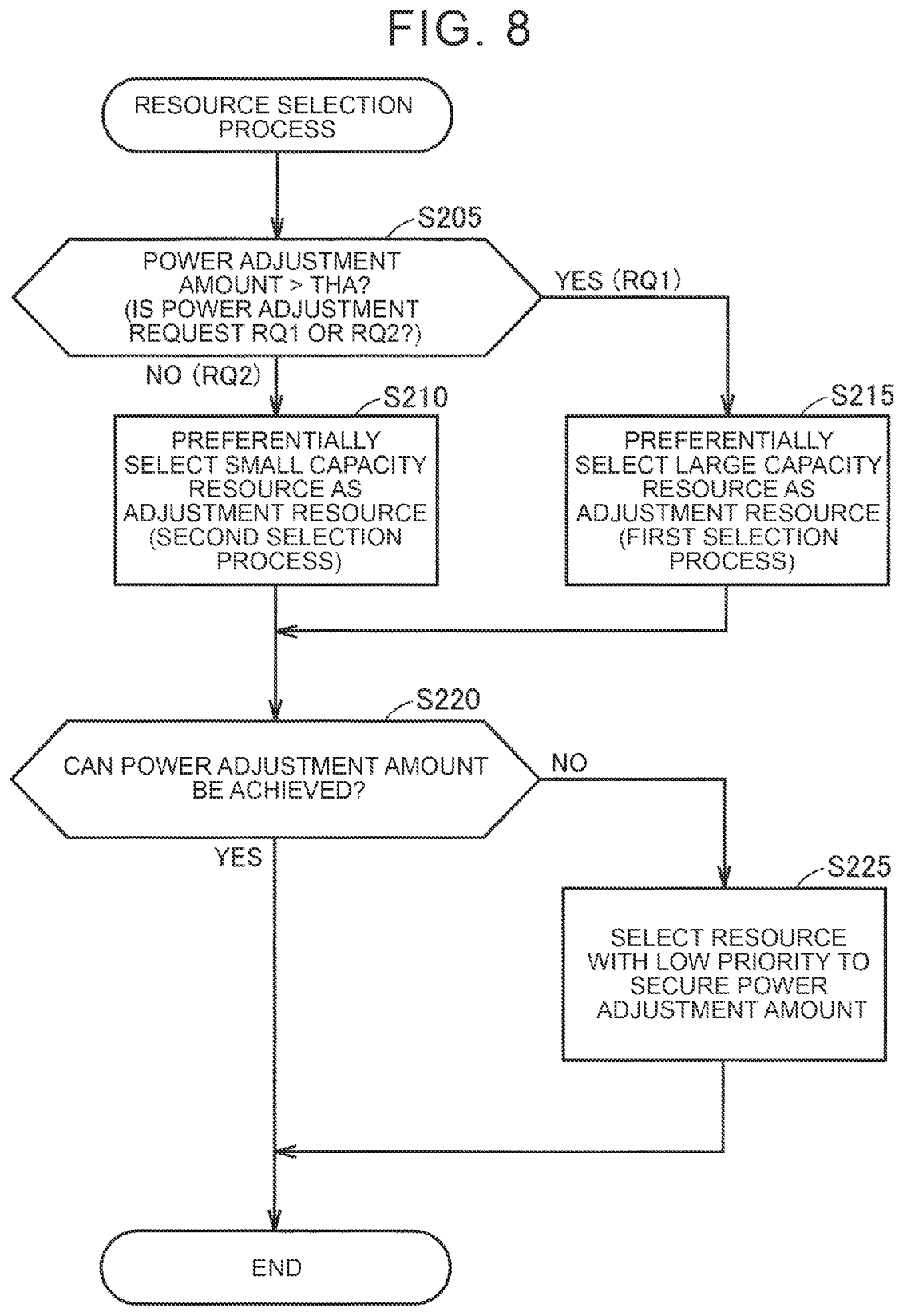

FIG. 8 is a flowchart showing detailed procedures of the resource selection process (S20 in FIG. 6). With reference to FIG. 8, the server 600 determines whether the power adjustment amount APA of the successfully-bid adjustment capability is larger than the threshold adjustment amount THA, that is, whether the power adjustment request is the request RQ1 or the request RQ2 (FIG. 4) (S205).

When the power adjustment amount APA is larger than the threshold adjustment amount THA, that is, when the power adjustment request is the request RQ1 (YES in S205), the server 600 executes the first selection process of preferentially selecting the BEV 110 (large capacity resource, large discharge power resource) from the adjustment resources of the resource group 500 (S215). The server 600 selects at least one BEV 110 such that the total reference discharge power of the at least one BEV 110 selected in the first selection process approaches the power adjustment amount APA. More specifically, the first selection process corresponds to setting the priority of each resource so that the priority of the BEV 110 is higher than the priority of the PHEV 120, and selecting the adjustment resource from the resource group 500 according to the priority (that is, in order from the resource with the highest priority).

On the other hand, when the power adjustment amount APA is equal to or less than the threshold adjustment amount THA, that is, when the power adjustment request is the request RQ2 (NO in S205), the server 600 executes the second selection process of preferentially selecting the PHEV 120 (small capacity resource, small discharge power resource) from the adjustment resources of the resource group 500 (S210). The server 600 selects at least one PHEV 120 such that the total reference discharge power of the at least one PHEV 120 selected in the second selection process approaches the power adjustment amount APA. More specifically, the second selection process corresponds to setting the priority of each resource so that the priority of the PHEV 120 is higher than the priority of the BEV 110, and selecting an adjustment resource from the resource group 500 according to the priority (that is, in order from the resource with the highest priority).

The server 600 determines whether the power adjustment amount APA can be achieved as a result of S210 or S215 (S220). When the power adjustment amount APA can be achieved, that is, when the power adjustment amount APA can be achieved only by the total reference discharge power of at least one adjustment resource selected in either the first or second selection process (YES in S220), the process ends. On the other hand, when the power adjustment amount APA cannot be achieved, that is, when the power adjustment amount APA cannot be achieved only by the total reference discharge power of at least one adjustment resource selected in either the first or second selection process (NO in S220), the process proceeds to step S225.

The server 600 secures the power adjustment amount APA by selecting a resource with a low priority (S225). For example, even when all the BEVs 110 are selected, when the first total discharge power, which is the total reference discharge power of all the BEVs 110, does not reach the power adjustment amount APA (NO in S220 after S215 is executed), the server 600 selects in S225 at least one PHEV 120 that meets the shortage of the first total discharge power with respect to the power adjustment amount APA. Alternatively, even when all the PHEVs 120 are selected, when the second total discharge power, which is the total reference discharge power of all the PHEVs 120, does not reach the power adjustment amount APA (NO in S220 after S210 is executed), the server 600 selects in S225 at least one BEV 110 that meets the shortage of the second total discharge power with respect to the power adjustment amount APA. After S225, the process ends.

When S225 is executed as described above, even when the first or second total discharge power is insufficient for the power adjustment amount APA, at least one BEV 110 or PHEV 120 is selected to meet the shortage. As a result, it is possible to easily achieve the power adjustment amount APA for each of the requests RQ1 and RQ2.

Figure 9:
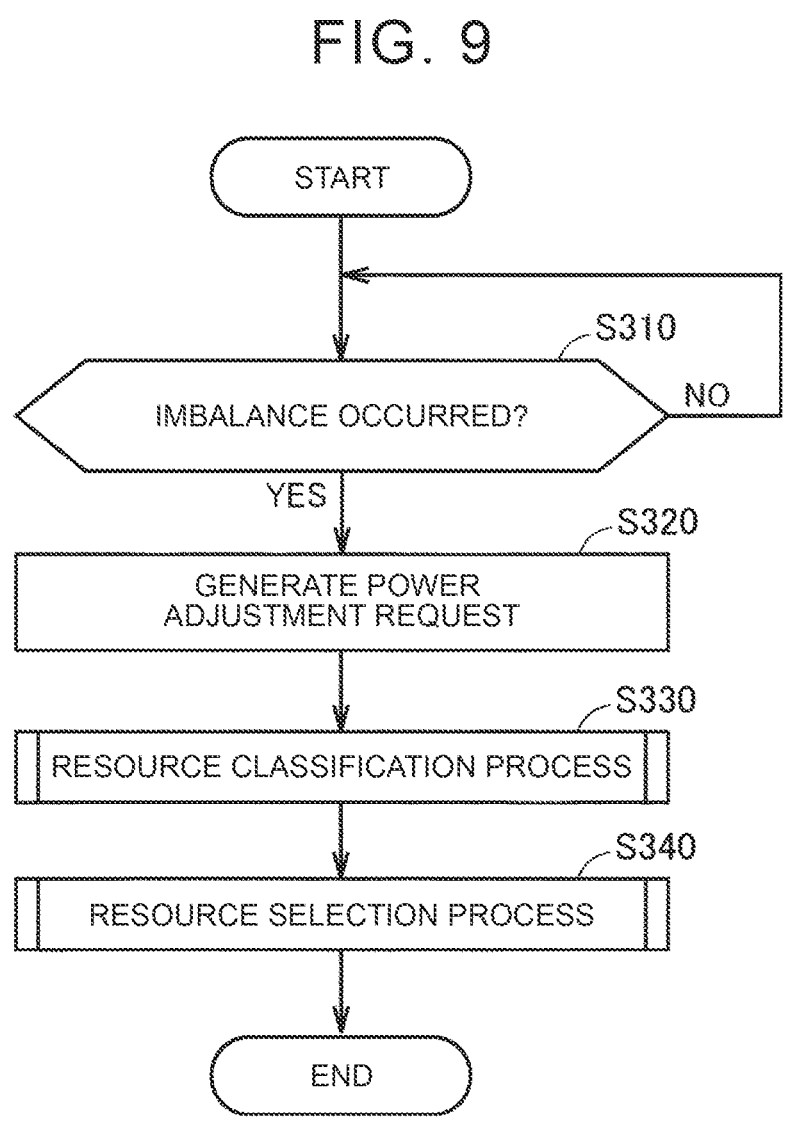

FIG. 9 is a flowchart showing the processes executed by the server 600 to eliminate the imbalance. This flowchart starts when the supply and demand plan value in the power grid PG is input to the server 600.

With reference to FIG. 9, the server 600 monitors the balancing for the power grid PG, and determines whether the imbalance (the difference between the plan value and the actual supply and demand) has occurred (S310). Specifically, the server 600 determines whether the difference is within a predetermined allowable range. When the imbalance has not occurred (NO in S310), this determination process continues. On the other hand, when the imbalance has occurred (YES in S310), the process proceeds to S320.

The server 600 generates a power adjustment request AR (S320), executes the resource classification process (S330), and then executes the resource selection process (S340). S330 and S340 are the same as S10 and S20 (FIG. 6), respectively. After S340, the process ends.

Modification of First Embodiment

Power resources are not limited to the BEV 110 and the PHEV 120, and may be other electrified vehicles such as a fuel cell electric vehicle (FCEV). Also in this case, the resource classification process is executed according to the magnitude of the capacity of the power storage device of each resource (the magnitude of the reference discharge power).

Second Embodiment

Figures 10, 11:
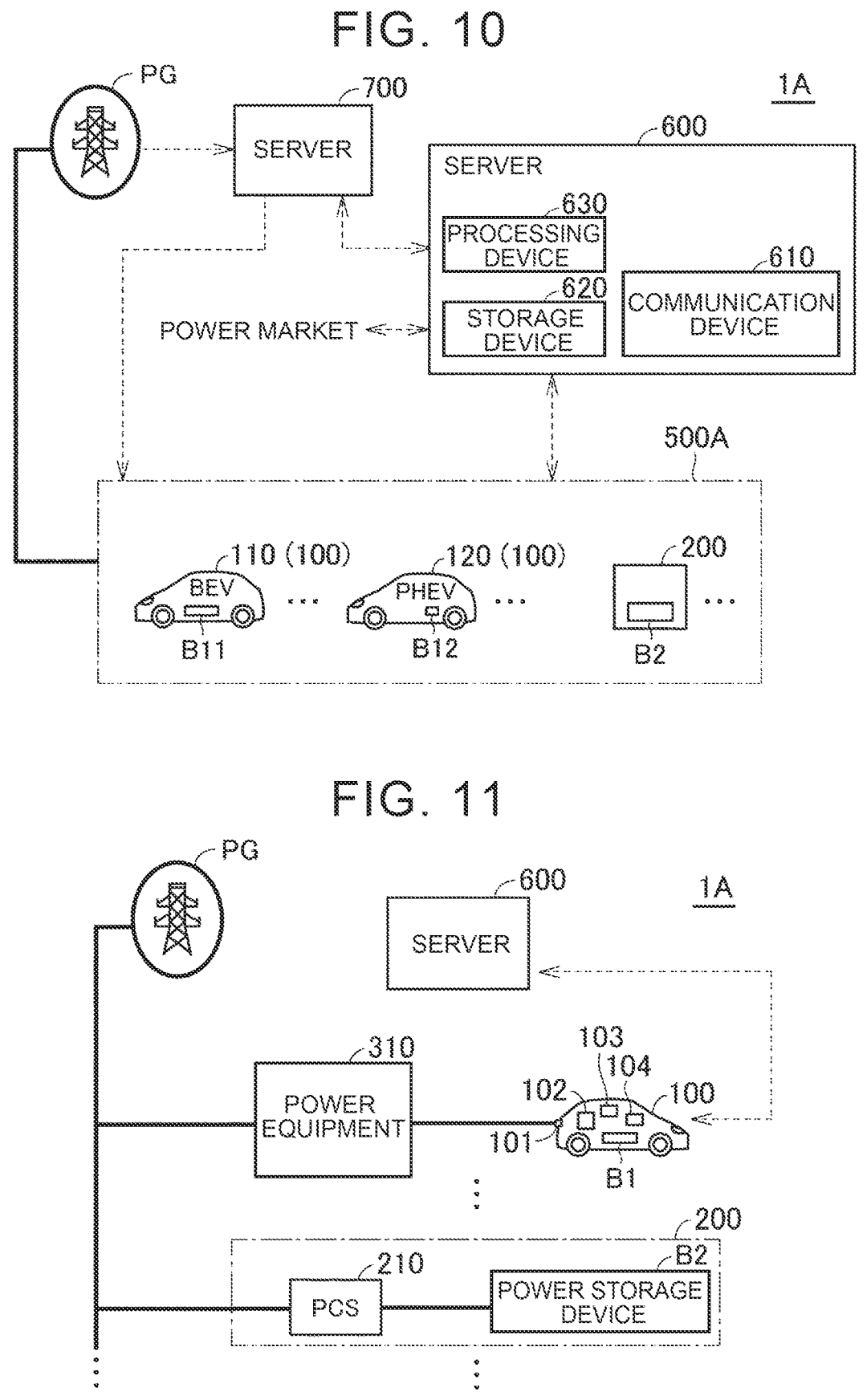

FIG. 10 is a diagram showing a schematic configuration of a power management system according to a second embodiment. With reference to FIG. 10, in a power management system 1A, a resource group 500A differs from the resource group 500 (FIG. 1) in that it further includes at least one power storage equipment 200. The power storage equipment 200 is equipped with a power storage device B2 as a stationary power storage device.

FIG. 11 is a diagram illustrating a detailed configuration of the power storage equipment 200. With reference to FIG. 11, the power storage equipment 200 includes the power storage device B2 and a power conditioning system (PCS) 210. The PCS 210 is connected to the power grid PG, and controls the discharge power from the power storage device B2 to the power grid PG. The PCS 210 is configured to be communicable with the server 600.

When the PCS 210 receives from the server 600 a command value for the discharge power from the power storage equipment 200 to the power grid PG, the discharge power may be remotely controlled according to the command value.

The server 600 classifies the power storage equipment 200 into either a small capacity resource or a large capacity resource according to whether the capacity of the power storage device B2 is equal to or less than the threshold capacity THC (resource classification process). In this example, it is assumed that both the BEV 110 and the power storage equipment 200 are classified as large capacity resources.

The server 600 may be configured to execute the resource selection process according to the time zone during which the power adjustment is implemented. For example, when implementing the power adjustment during a first time zone (for example, daytime hours from 6:00 am to 6:00 pm), the server 600 preferentially selects the power storage equipment 200 over the vehicle 100 (for example, the BEV 110) as an adjustment resource. Alternatively, when implementing the power adjustment during a second time zone (for example, nighttime hours from 6:00 μm to 6:00 am), the server 600 preferentially selects the vehicle 100 (for example, the BEV 110) over the power storage equipment 200 as an adjustment resource.

The vehicle 100 is more likely to be used by users during daytime hours than during nighttime hours, and thus is considered less likely to participate in the power adjustment during daytime hours. When the resource selection process is executed as described above, the power storage equipment 200 is preferentially selected as an adjustment resource over the vehicle 100 during daytime hours. Therefore, it becomes easier to avoid a situation in which the vehicle 100 cannot participate in the power adjustment because it is used by a user even though the vehicle 100 has been selected as an adjustment resource. On the other hand, in nighttime hours, the vehicle 100 is preferentially selected as an adjustment resource over the power storage equipment 200. Therefore, it becomes easier for the vehicle 100 to participate in the power adjustment, which makes it easier to utilize the vehicle 100 as an adjustment resource.

As described above, when the resource selection process is executed according to the time zone in which the power adjustment is implemented, each of the vehicle 100 and the power storage equipment 200 can be appropriately utilized as power resources according to the time zone.

The first time zone is not limited to daytime hours as long as it is set as a time zone in which the possibility of the user using the vehicle 100 is higher than that of the second time zone. Similarly, the second time zone is not limited to nighttime hours, as long as it is set as a time zone in which the possibility of the user using the vehicle 100 is lower than that of the first time zone.

OTHER MODIFICATIONS

Aggregators may be divided into child aggregators (resource aggregators) and parent aggregators (aggregation coordinators). In this case, the server 600 belongs to the child aggregator and receives the power adjustment request AR from the server of the parent aggregator.

The embodiments disclosed herein should be considered to be exemplary and not restrictive in all respects. The scope of the present disclosure is shown by the scope of claims rather than the description of the above embodiment, and is intended to include all modifications within the meaning and the scope equivalent to the scope of claims.

What is claimed is:

1. A management device that manages a plurality of power resources, wherein: each of the power resources is equipped with a power storage device and is configured to be able to participate in power adjustment in a power grid by discharging power of the power storage device to the power grid; the management device includes a communication unit configured to communicate with each of the power resources, and a processing unit; the processing unit executes a classification process of classifying each of the power resources into a first resource and a second resource with a capacity of the power storage device larger than the capacity of the power storage device of the first resource, and a resource selection process of selecting, from among the power resources, an adjustment resource of which participation in the power adjustment is requested through the communication unit, in response to an adjustment request requesting implementation of the power adjustment; the resource selection process includes a first selection process of preferentially selecting the second resource as the adjustment resource over the first resource when the adjustment request is a first request, and a second selection process of preferentially selecting the first resource as the adjustment resource over the second resource when the adjustment request is a second request; a power adjustment amount of the first request is larger than a power adjustment amount of the second request; the first request is the adjustment request different from the second request; and the second request is the adjustment request for eliminating imbalance that is the difference between a power demand amount and a power supply amount in the power grid; wherein: the processing unit is configured to trade in a power market an adjustment capability for implementing the power adjustment and to generate the adjustment request when the adjustment capability is successfully bid in the power market; the adjustment capability is traded in frame units in the power market; and the processing unit generates the first request when the adjustment capability having the number of frames larger than a predetermined number of frames is successfully bid, and generates the second request when the adjustment capability having the number of frames equal to or less than the predetermined number of frames is successfully bid.

2. The management device according to claim 1, wherein a power adjustment period of the first request is longer than a power adjustment period of the second request.

3. The management device according to claim 1, wherein: a length of the frame is 30 minutes; and the predetermined number of frames is one.

4. The management device according to claim 1, wherein: the first resource is a resource in which discharge power of the power storage device is equal to or less than a threshold discharge power; the second resource is a resource in which the discharge power is larger than the threshold discharge power; and the threshold discharge power is 2 kW or more and 5 kW or less.

5. The management device according to claim 4, wherein: when the adjustment request is the first request, the processing unit selects at least one second resource such that a total discharge power of the at least one second resource selected in the first selection process approaches the power adjustment amount of the adjustment request, and

selects at least one first resource to meet a shortage of a first total discharge power with respect to the power adjustment amount of the adjustment request, in a case where the first total discharge power that is the total discharge power of all of the second resources does not reach the power adjustment amount of the adjustment request even when all of the second resources are selected; and when the adjustment request is the second request, the processing unit selects at least one first resource such that a total discharge power of the at least one first resource selected in the second selection process approaches the power adjustment amount of the adjustment request, and selects at least one second resource to meet a shortage of a second total discharge power with respect to the power adjustment amount of the adjustment request, in a case where the second total discharge power that is the total discharge power of all of the first resources does not reach the power adjustment amount of the adjustment request even when all of the first resources are selected.

6. The management device according to claim 1, wherein the power resources include a vehicle electrically connected to the power grid via power equipment.

7. The management device according to claim 6, wherein: the power resources include power storage equipment in which the power storage device is a stationary power storage device; the processing unit preferentially selects the power storage equipment as the adjustment resource over the vehicle when implementing the power adjustment in a first time zone, and preferentially selects the vehicle as the adjustment resource over the power storage equipment when implementing the power adjustment in a second time zone; and the first time zone is set as a time zone in which a user of the vehicle is more likely to use the vehicle than in the second time zone.

* * * * *